United States Patent [19]

Snell

[11] Patent Number: 5,528,116

[45] Date of Patent: Jun. 18, 1996

[54] METHOD AND DEVICE FOR CALIBRATION OF MOVEMENT AXES OF AN INDUSTRIAL ROBOT

[75] Inventor: John-Erik Snell, Västerås, Sweden

[73] Assignee: Asea Brown Boveri AB, Vasteras, Sweden

[21] Appl. No.: 240,706

[22] PCT Filed: Nov. 24, 1992

[86] PCT No.: PCT/SE92/00804

§ 371 Date: May 9, 1994

§ 102(e) Date: May 9, 1994

[87] PCT Pub. No.: WO93/11915

PCT Pub. Date: Jun. 24, 1993

[30] Foreign Application Priority Data

Dec. 10, 1991 [SE] Sweden .................................. 9103642

[51] Int. Cl.⁶ ....................................................... B25J 9/22
[52] U.S. Cl. .................. 318/568.13; 318/568.22; 901/3; 901/16
[58] Field of Search .............................. 318/568.22, 560, 318/568.24, 568.13, 568.11, 568.15; 901/3, 4, 5, 9, 15, 16

[56] References Cited

U.S. PATENT DOCUMENTS

| 4,639,878 | 1/1987 | Day et al. | 901/9 |
| 4,670,849 | 6/1987 | Okada et al. | 901/15 |
| 4,763,276 | 8/1988 | Perreirra et al. | 901/15 |
| 4,815,006 | 3/1989 | Anderson et al. | 901/9 |
| 4,965,499 | 10/1990 | Taft et al. | 318/568.11 |

*Primary Examiner*—John W. Cabeca
*Attorney, Agent, or Firm*—Watson, Cole, Grindle & Watson

[57] ABSTRACT

In a calibration method for an industrial robot (2–6), a calibration tool (8) supported by the robot hand (6) is brought into contact with pairwise opposite side surfaces of a calibration body (7) with a known edge length. Thereafter, the output signals from the position transducers of the robot axes are read and stored. This method is repeated a plurality of times with different robot configurations. Thereafter, the calibration parameters of the robot are calculated starting from the kinematic equations of the robot, a model of the relationship between axial position and position transducer signal, the known edge lengths of the calibration body, and the read and stored position transducer signals. (FIG. 1)

5 Claims, 9 Drawing Sheets

METHOD AND DEVICE FOR CALIBRATION OF MOVEMENT AXES OF AN INDUSTRIAL ROBOT

TECHNICAL FIELD

The invention relates to a method for calibration of a number of movement axes of an industrial robot, which has a plurality of movement axes with a position transducer for each one of the axes which is adapted to supply an output signal which defines the current position of the axis, and a robot hand for supporting a tool.

The invention also relates to an industrial robot system with an industrial robot which has a plurality of movement axes with a position transducer for each one of the axes which is adapted to supply an output signal which defines the current position of the axis, a robot hand for supporting a tool, and a control system for controlling the position and orientation of the robot hand in accordance with a program and adapted to receive the output signals of the position transducers.

BACKGROUND ART

A typical industrial robot is previously known from U.S. Pat. No. 3,909,600 and U.S. Pat. No. 3,920,972. Such a robot has a stand which is rotatably arranged on a foot and which supports a first robot arm which is rotatable in relation to the stand. In the outer end of this arm, and rotatable in relation thereto, a second robot arm is arranged. In its outer end this second arm supports a hand which is provided with a tool attachment and which is rotatable in two or three degrees of freedom in relation to the other arm. The robot is provided with control equipment for controlling the position and orientation of the robot hand. For each one of the above-mentioned axes of rotation, servo equipment comprising a driving motor and a position transducer is provided, the position transducer delivering a signal which is a measure of the angle of rotation of the current axis in relation to a reference position. To the servo system of each axis there is supplied a desired value for the angle of rotation of the axis, and the driving motor of the axis causes the robot to move in the current axis until the angular position indicated by the position transducer of the axis corresponds to the desired value supplied to the servo system.

For the position and orientation of the robot hand to correspond to the desired position and orientation, the mechanical structure of the robot and the data which describe it must be known with a high accuracy. This means that it is not sufficient for the nominal robot model to be known but also the individual deviations from the nominal model must be known. These deviations may be: variations in arm lengths, deviations in the orientations of the axes of rotation of the joints, and lateral displacements (offset) of the axes. These deviations arise in the manufacture of the different mechanical components and in the assembly of these. To this is also to be added that the angle indicated by the position transducer of an axis must with great accuracy correspond to the actual angle of rotation of that mechanical part of the robot which is controlled with the aid of the axis in question.

Because of difficulties in carrying out the calibration in a manner which is economical and adapted to production, the currently normal method is only to consider the nominal structure of the robot for describing the geometry of the robot.

For determining the relationship between the position transducer signals of the robot axes and the actual angles of rotation of the arms of the robot, different forms of calibration methods are used.

In one such calibration method, the robot is caused to assume such a position that the actual angles of rotation in the different axes are known, whereupon the angles of rotation indicated by the position transducers are compared with the actual angles. The position transducers may thereafter be adjusted such that the angles indicated thereby correspond to the actual angles. Alternatively, the deviations between the indicated angles and the actual angles may be stored and then be used during operation for correction of the output signals from the position transducers.

According to a previously known calibration method, the different parts of the robot are set at predetermined initial positions with the aid of a spirit-level which is mounted on accurately finished projections, provided for that purpose, on the different parts of the robot. In the initial position, for example, the above-mentioned first arm may be vertical, the second arm and the hand horizontal etc. In this so-called synchronization position, the actual angles in the different axes of the robot are in this way known, the angles indicated by the position transducers may be read off, and for each axis a so-called offset value may be determined which constitutes the difference between the known actual angle and the angle received from the position transducer. However, this method requires mounting of special additional equipment (the water-levels). Further, the different parts of the robot must be designed such that an accurate mounting of the water-levels is made possible, which entails an increased cost of the mechanical parts of the robot. The calibration method must be carried out manually and requires a relatively considerable time expenditure. Further, the method has a limited accuracy.

From Swedish patent application 9000273-4 a calibration method is known in which a parallelepipedic calibration body is used, the position of which in the base coordinate system of the robot must be known. A calibration tool mounted on the robot hand is brought into contact with the calibration body in a number of different robot configurations. Thereafter, the offset values of the position transducer of the robot are calculated on the basis of the kinematic equations of the robot, a model of the relationship between axial position and position transducer signal, the coordinates in the basic system which are known in the calibration positions, and the read and stored position transducer signals. A disadvantage of this method is that the position of the calibration body must be accurately known. It is normally difficult, in a robot installation in practice, to arrange a calibration body such that its side surface has known coordinates without the use of external measuring equipment. Further, according to this method only the offset values of the position transducers are obtained. The method is based on the nominal kinematic model of the robot and does not take into account defects in manufacture in the individual robot.

The final result is that the actual position of a robot does not correspond to the desired one. The deviation may be several millimeters. This means, inter alia, that a robot which is positioned in a production line cannot be replaced, for example after a breakdown, without the robot program being adjusted. This requires a costly downtime for the production line.

The possibility of individually calibrating each robot unit and compensating for defects in manufacture in the robot, and hence increasing the positioning accuracy, has been demonstrated by many scientists. However, the methods have not gained acceptance in practice. To be useful in practice, the method should be possible to use on the shop floor without demands for expensive equipment. The equipment which is required shall be easily movable.

SUMMARY OF THE INVENTION

The invention aims to provide a calibration method which does not require extensive additional equipment for the calibration, which provides a high accuracy in the calibration, which is possible to carry out automatically and hence rapidly and inexpensively, which is independent of how the robot is erected, and which provides a possibility of compensating for geometrical defects in the mechanical parts of the robot. The invention also aims to provide an industrial robot system with means for carrying out the above-mentioned method.

What characterizes a method and an industrial robot system according to the invention will become clear from the appended claims.

BRIEF DESCRIPTION OF THE DRAWINGS

In the following the invention will be described in greater detail with reference to the accompanying FIGS. 1–8.

DESCRIPTION OF THE PREFERRED EMBODIMENTS

Figure 1:
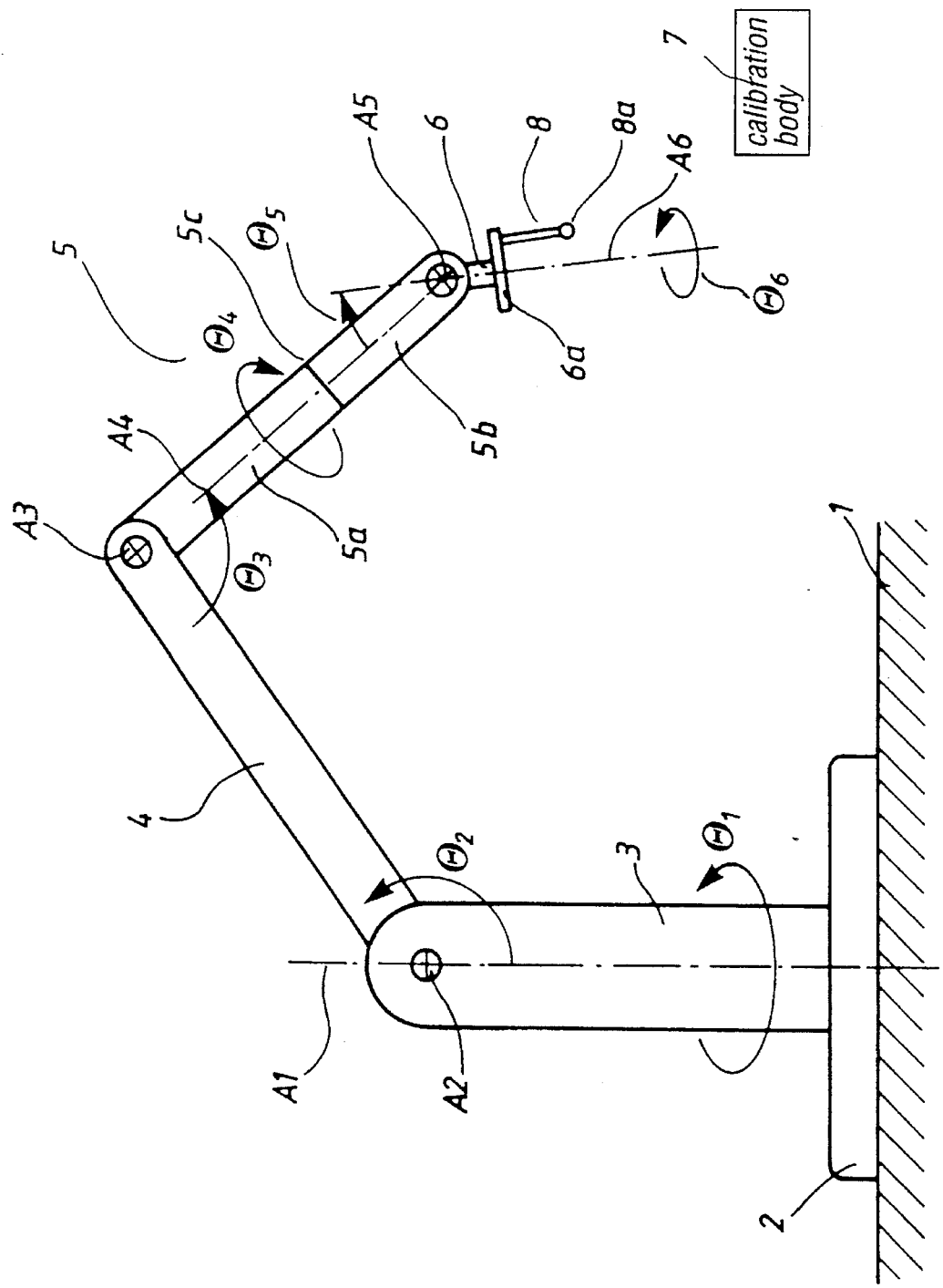
FIG. 1 schematically shows an industrial robot with a calibration body and a calibration tool according to the invention.

FIG. 1 shows an example of an industrial robot, known per se, for the calibration of which the method according to the invention can advantageously be used. On a base 1 the robot foot 2 is fixedly mounted. The robot has a stand 3, which is rotatable in relation to the foot 2 around a vertical axis A1. In the upper end of the stand a first robot arm 4 is journalled and rotatable in relation to the stand around a second axis A2. In the outer end of the arm a second arm 5 is journalled and rotatable in relation to the first arm around an axis A3. The robot arm 5 comprises two parts 5a and 5b, of which the outer part 5b is rotatable in relation to the inner part 5a around an axis of rotation A4 coinciding with the longitudinal axis of the arm. In its outer end the arm 5 supports a so-called robot hand 6, which is rotatable around an axis of rotation A5 perpendicular to the longitudinal axis of the arm. The robot hand comprises a tool attachment 6a. The outer part of the robot hand and hence the tool attachment 6a are rotatable in relation to the inner part of the robot hand around an axis of rotation A6. The angles of rotation in the six rotational axes A1 . . . A6 are designated θ1 . . . θ6 in the figure. Within the working range of the robot there is arranged a calibration body 7. This body has the shape of a parallelepiped with plane side surfaces and with its edges parallel to the axes in the so-called base coordinate system of the robot.

Figure 2:
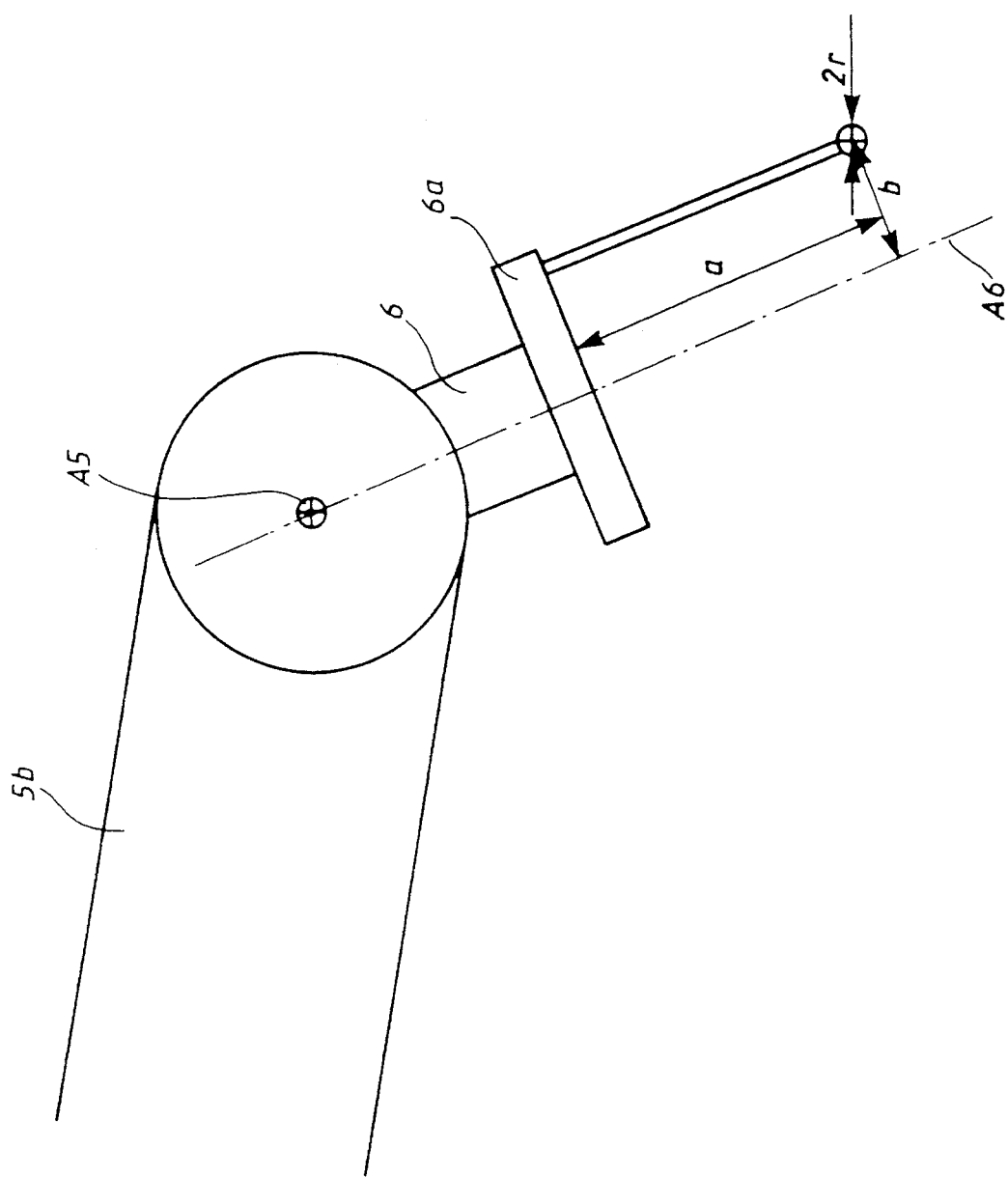
FIG. 2 shows in more detail a calibration tool for carrying out the method according to the invention.

FIG. 2 shows in more detail the robot hand 6, the tool attachment 6a and the calibration tool 8 mounted on the tool attachment. The tool is mounted eccentrically on the tool attachment in relation to the axis of rotation A6 of the attachment. In its outer end the tool supports a spherical contact body 8a. The radius r of the contact body and the distances a from the tool attachment and b from the axis of rotation of the attachment in the centre of the contact body are assumed to be known.

Figure 3:
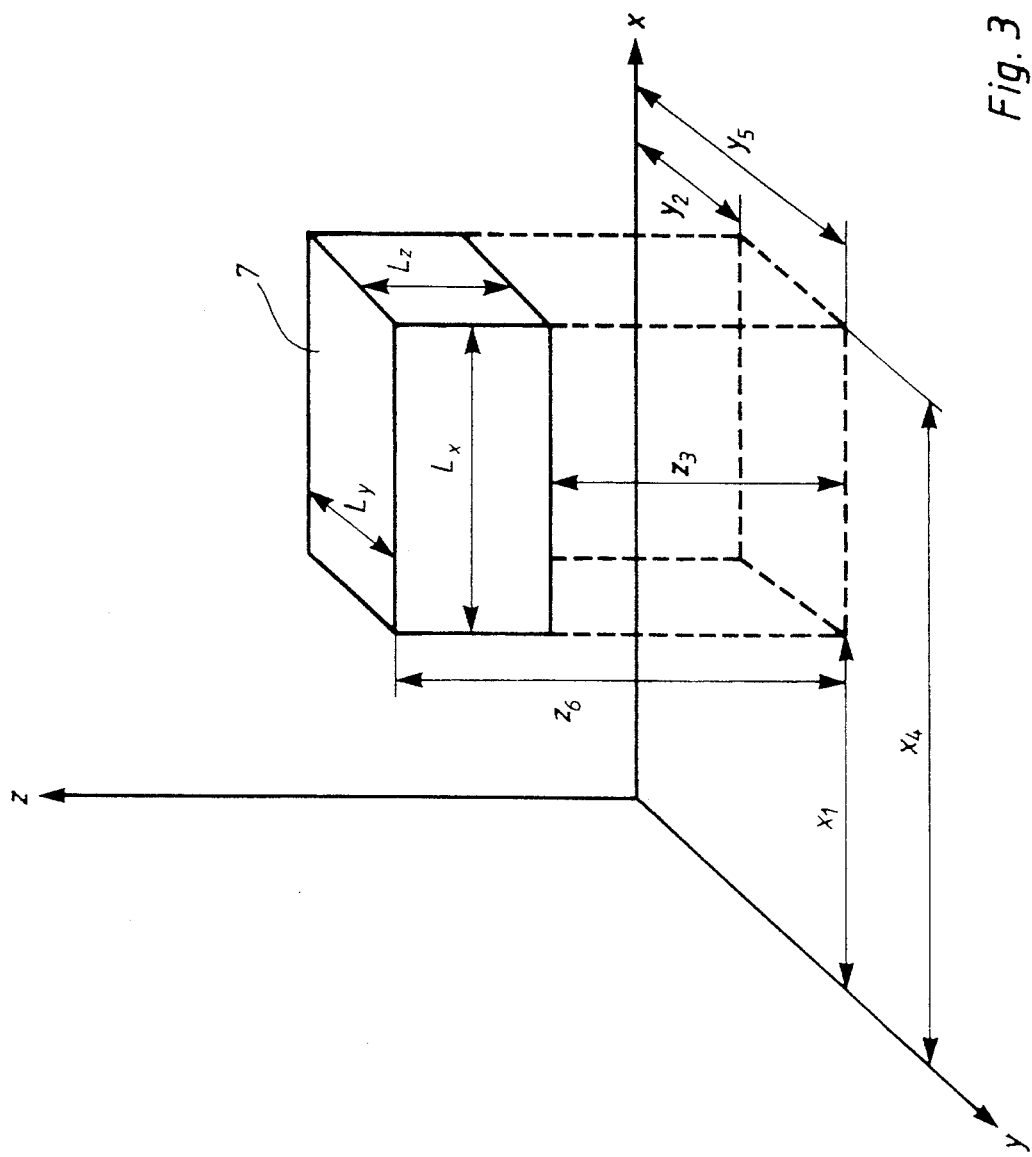
FIG. 3 shows the calibration body in the base coordinate system of the robot.

FIG. 3 shows the so-called base coordinate system of the robot, which system is an orthogonal coordinate system with the z-axis coinciding with the angle of rotation A1 in FIG. 1 and with the x-axis and the y-axis in predetermined directions in relation to the robot foot 2. The calibration body 7, as mentioned above, is arranged with its edges parallel to the axes in the base coordinate system. The side surfaces of the calibration body are described by the following relationships:

$$x=x1$$
$$x=x4$$
$$y=y2$$
$$y=y5$$
$$z=z3$$
$$z=z6$$

The coordinates x1 . . . z6 need not be known. On the other hand, the differences x1–x4, y2–y5, z3–z6 are known with a high accuracy and equal to the edge lengths $L_x$, $L_y$, $L_z$ of the measuring body. These lengths may, for example, be $L_x=L_y=L_z=10$ cm.

In the calibration method according to the invention, a number of measurements are carried out. The number of pairs of measurements is at least as great as the number of calibration parameters to be calibrated. The number of measurements may, however, advantageously be higher, preferably considerably higher, thus obtaining an increased accuracy in the calibration. For at least some pair of opposed side surfaces, and possibly for all three pairs of such surfaces, a plurality of pairs of measurements are carried out with mutually different robot configurations. The calibration method according to the invention tends to provide higher accuracy the greater the differences are between the configurations used.

Figure 4A:
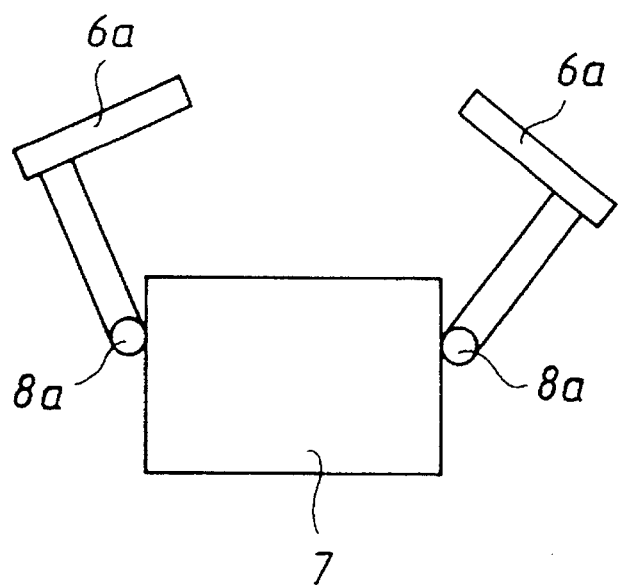
FIGS. 4a–4d show examples of different positions assumed by the calibration tool when carrying out the calibration method.
Figure 4B:
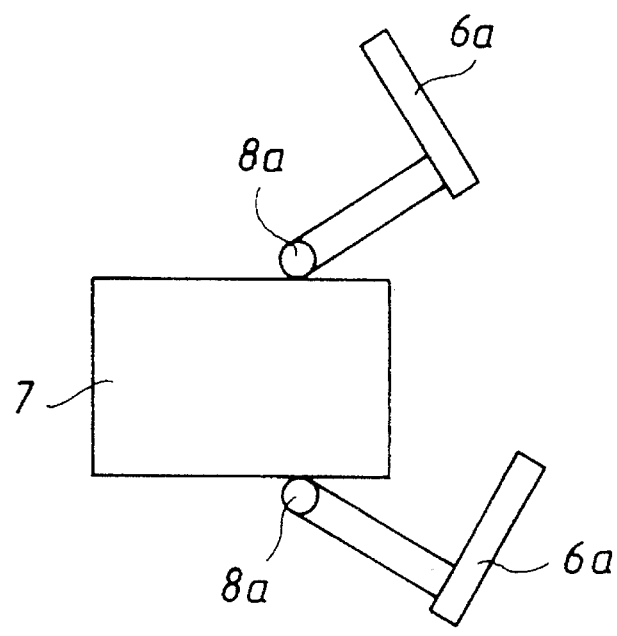

During each measurement, the robot is first run—manually or automatically—to a configuration where the contact body 8a is at a point at some distance from one of the surfaces of the calibration body. The robot is then run such that the contact body moves in a direction towards the above-mentioned surface of the calibration body until the calibration body makes contact with this surface. This movement can be carried out in a manner known per se by means of a search method which interrupts the movement upon contact with or with the aid of a so-called soft servo which, per se, strives to continue the movement after contact but which can only apply a limited force to the calibration tool. When contact has been achieved, the calibration tool assumes the position shown to the left in FIG. 4a and the output signals from the position transducer of the robot are read and stored. The measurement is then repeated towards the opposite side surface (the position shown to the right in FIG. 4a). The difference in the coordinate in question is known through the edge length of the measuring body.

Figure 4C:
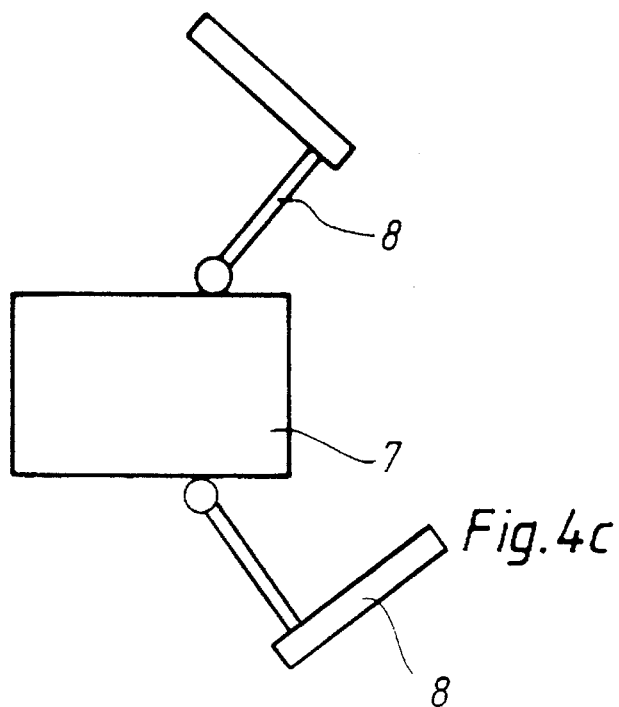
Figure 4D:
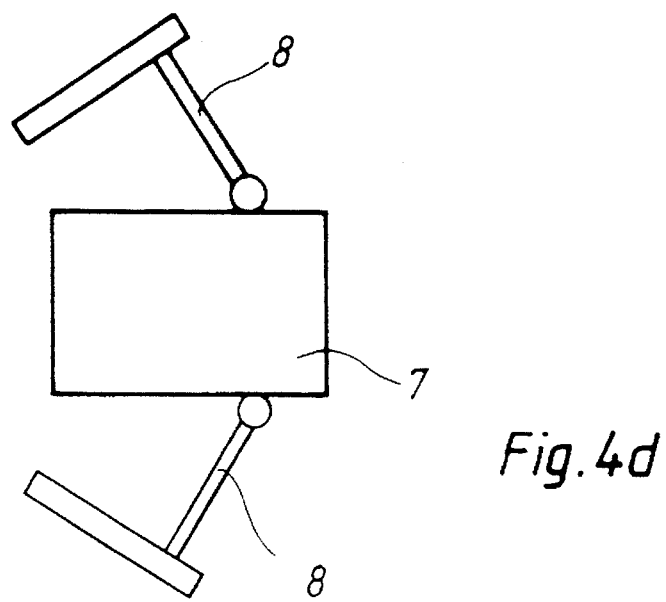

Measurements are suitably carried out on as many pairs of the side surfaces of the calibration body as practically possible. Suitably, a plurality of measurements are carried out on each pair of side surfaces with different configurations of the robot. The configuration of the robot is defined by its axis angles, and one configuration differs from another if at least some of the axis angles is changed. As shown in FIGS. 4c and 4d, two pairs of measurements can be made with the contact body in substantially the same position in relation to the calibration body but with different robot configurations.

As position transducers in industrial robots resolvers are usually used, and the calibration method according to the invention will be described below as applied to an industrial robot with this type of position transducer. However, the invention can be applied also to robots with other types of position transducers. The calibration parameters which need to be identified are for each degree of freedom of the robot (cf. FIG. 8)

Offset coordinate for arm link (OX, OY, OZ)

Obliquity of axis of rotation of arm link (Y, P)

Offset value of position transducer of axis of rotation (K2)

For a 6-axis robot this provides altogether 36 parameters which are to be identified. Thus, altogether 36 pairs of positionings to the side surfaces of the measuring body are required. For each positioning, the position transducer of the robot is read, and it is also noted to which of the surfaces of the measuring body the positioning is performed.

The relationship between the coordinates for the position of the calibration tool and the arm angles of the robot can be expressed as $$f_x(\theta)=x$$

$$f_y(\theta)=y$$

$$f_z(\theta)=z$$

The arm angle ($\theta$) can be expressed in the deflection $\varnothing$ of the position transducers through $$\theta = K1 \cdot \varnothing + K2$$

where

K1 is the exchange in the transmission between arm angle and measuring transducer (K1 is known), K2 is an unknown offset value.

By forming a difference pair between two coordinates and relating this to the edge length of the measuring body, an equation may be set up $$f_x(\theta_1) - f_x(\theta_2) = \text{edge length } L_x \text{ of measuring body}$$

After insertion of the expression for arm angle $\theta$ and the read out values for the measuring transducers $\varnothing$ for the current measuring pair, the equation may be expressed as $$g(K21, K22, K23, K24, K25, K26, OX1, OX2, OX3, OX4, OX5, OX6, OY1, OY2, OY3, OY4, OY5, OY6, OZ1, OZ2, OZ3, OZ4, OZ5, OZ6, Y1, Y2, Y3, Y4, Y5, Y6, P1, P2, P3, P4, P5, P6) = L_x$$

or, written in a more compact way, $$g_x(K2, OX, OY, OZ, Y, P) = L_x$$

In this way at least 36 equations are generated.

The calculation of the unknown calibration parameters from the non-linear equation system may be made according to the following:

First, preliminary values of the calibration parameters are assumed. The offset values K2 may be obtained by bringing the robot to an initial position, whereupon vernier scales on each axis are read and the differences between the read values and the resolver angles are formed. In this position, also the initial speed for the resolvers is determined (the speed is set to zero). The other calibration parameters are set to zero (nominal robot). For each measuring pair/configuration j, the difference in the current coordinate of the calibration tool is calculated starting from the read resolver values and from the kinematic model of the robot. The difference $\epsilon_j$ between the value thus calculated and the known edge length is formed. When these differences have been formed for all the measuring pairs, a quantity $\epsilon = \sqrt{(\epsilon_1^2 + \epsilon_2^2 + \ldots + \epsilon_{36}^2)}$ is determined.

The quantity $\epsilon$ is then compared with a predetermined tolerance value. If $\epsilon$ is greater than this value, the set values are adjusted according to the Newton-Gauss algorithm for solution of overdetermined non-linear equation systems, and the above procedure is repeated until $\epsilon$ is lower than the tolerance value. Finally, the calibration parameters thus determined are stored to be used for correcting the position of the robot during operation.

To make it possible to determine the unknown parameters, the number of measuring pairs must be at least as great as the number of parameters which are to be calibrated. In the case described above it has been assumed that all the six axes of the robot are to be calibrated and the smallest possible number of measuring pairs, namely 6·6=36, has been assumed. It may be suitable, however, to carry out a considerably larger number of measurements with different configurations, which has proved to provide an improved accuracy in the calibration.

Figure 5:
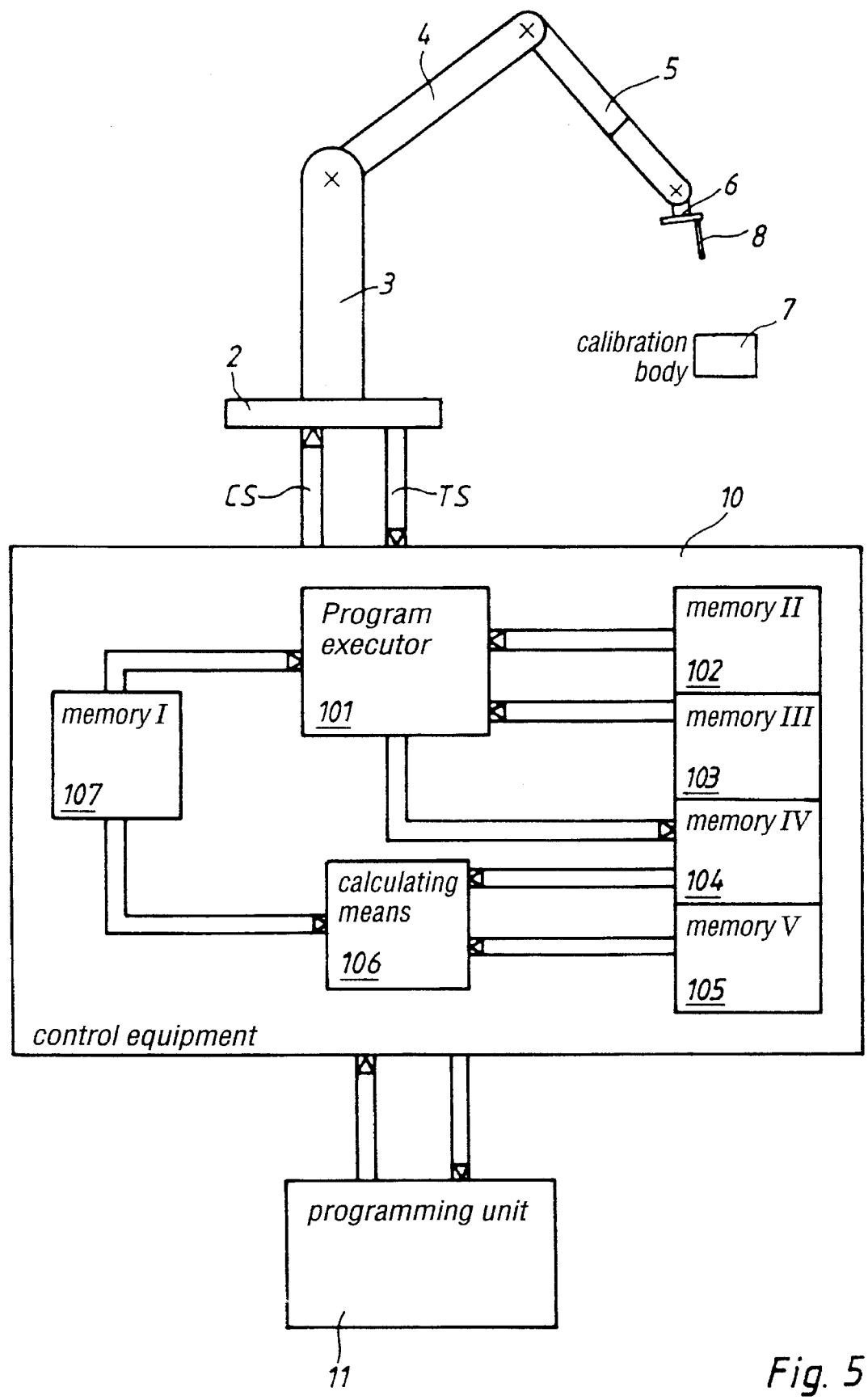
FIG. 5 shows the configuration of an industrial robot system with means for carrying out the method according to the invention.

FIG. 5 shows, in principle, the configuration of an industrial robot system with control means for automatically carrying out the calibration method described above. The robot 2–6 is provided in the manner described above with a calibration body 7 and a calibration tool 8. The control equipment 10 of the robot comprises, in a known manner, computer equipment with the necessary memories for programs and other data, drive members for the driving motors of the different robot axes as well as the necessary supply equipment. The control equipment 10 is connected to a programming unit 11 for programming and other operation of the robot. Of the control equipment, FIG. 5 shows the program executor 101, which in a known way causes the robot to carry out a stored program. In a memory 107 the kinematic model of the robot is stored. In a memory 102 the movement program for the calibration procedure is stored. In a memory 103 there are stored, prior to the automatic calibration procedure, values of the preliminary calibration parameters.

A memory area 104 is intended for storage of the resolver values which are read off during each measurement when carrying out the calibration method. In a further memory area 105 there are stored, prior to the automatic calibration procedure, the necessary basic data such as the dimensions of the measuring body 7 and the length and tip radius of the calibration tool. Further, the control equipment comprises calculating means 106 which, when all the measurements have been executed, on the basis of the read-off resolver values, the kinematic model and basic data from the memory 105, calculate the calibration parameters in the manner described above. The control equipment delivers the necessary control signals CS to the robot and receives from the robot resolver values TS.

Figure 6:
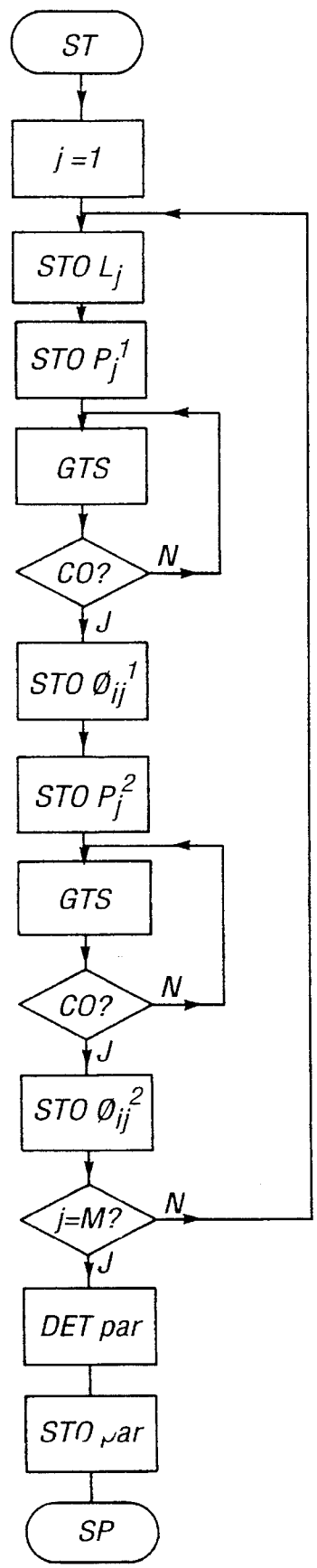
FIG. 6 shows in the form of a flow diagram an example of a program for automatically carrying out the calibration method.

Prior to the calibration, a calibration program is stored, for example once and for all, into the memory area 102. The program is adapted to control the movements and other functions of the robot during the calibration procedure. Further, there are stored in the memory area 103 preliminary values for the calibration parameters, and in the memory area 105 the dimensions of the calibration body as well as length and tip radius of the calibration tool. The configuration of the calibration program is shown in FIG. 6. The quantity j indicates the current measuring pair and it is assumed that measurements are to be carried out with M different measuring pairs. After start-up of the program—ST—j is set equal to 1. Thereafter, there are stored in the working memory of the equipment the current side surface and the current edge length (STO $L_j$) as well as coordinates for an initial point (block STO $P_j^1$). This information indicates, for the measuring pair in question, both the current side surface of the calibration body and in what direction the calibration tool is to be moved from the initial point to make contact with the side surface. After this, the robot is moved—block GTS—in a direction towards the side surface. In block CO? it is sensed whether contact has been obtained with the side surface. If the answer is no, the movement continues, and if the answer is yes, the resolver values $\emptyset_{ij}$—block STO $\emptyset_{ij}^1$—are stored in the memory area 104. Thereafter, the same procedure is carried out for the opposite side surface. Then it is investigated, in block j=M?, whether all desired measurements have been carried out. If this is not the case, j=j+1 is set and the next measuring pair is carried out. When all the measurements have been carried out, that is, when j=M, the program proceeds to a calculation method, DET par, in which the calibration parameters are determined. The parameters thus determined are then stored—STO par—for later use in operation of the robot. After this, the program is terminated—block SP.

Figure 7:
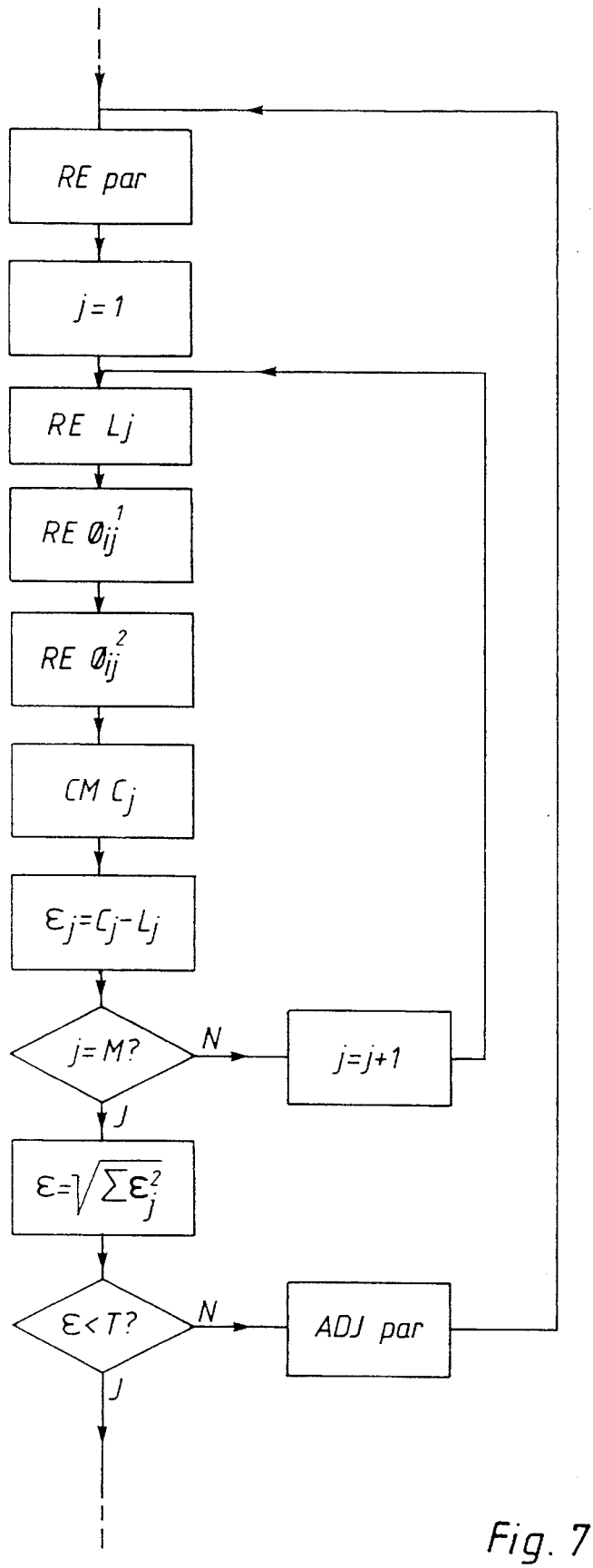
FIG. 7 shows in the form of a flow diagram the principle of carrying out the calculations with the aid of which, as a result of the calibration method, the calibration parameters are obtained.

FIG. 7 shows in more detail the configuration of the functional block DET par. The calculation starts with a reading of current values of the calibration parameters, block RE par. The first time these values are obtained from the memory area 103, where the preliminary calibration parameters are obtained. Then j is set at j=1, that is, the first measuring pair is selected. The edge length and the side surface which apply to this measuring pair as well as the resolver values $\emptyset_{ij}^1$ and $\emptyset_{ij}^2$, read off and stored for this measuring pair, are read off. This is performed in blocks RE $L_j$, RE $\emptyset_{ij}^1$, RE $\emptyset_{ij}^2$. Thereafter there is calculated for the current measuring pair, starting from the kinematic model of the robot, the difference $C_j$ between the two positions of the calibration tool in the coordinate which corresponds to the side surfaces of the pair in question (block CM $C_j$). Then the difference $\epsilon_j = C_j - L_j$ is formed, where $L_j$ is the known edge length. Then—at j=M?—it is sensed whether all the current measuring pairs have been completed. If this is not the case, j is set at j=j+1 and the corresponding calculation is carried out for the next measuring pair. When all the measuring pairs have been completed, j=M and a quantity $\epsilon=\sqrt{(\epsilon_1^2+\epsilon_2^2+ \ldots \epsilon_M^2)}$ is formed. If this quantity amounts to or exceeds a predetermined tolerance value T, this is an indication that the used values for the calibration parameters are incorrect. In that case, these values are adjusted, for example according to the above-mentioned Newton-Gauss algorithm, in block ADJ par, whereupon the calculation is repeated. This method is repeated with successive adjustments of the calibration parameters and subsequent determinations of the error $\epsilon$ until the latter quantity is lower than the predetermined tolerance level. When this is the case, the program proceeds to the next block in FIG. 6, where the last used values of the calibration parameters are stored.

FIG. 8 shows calibration parameters for a robot axis. The figure shows the nominal coordinate system of a robot, $X_{nom}$, $Y_{nom}$, $Z_{nom}$, as well as its actual coordinate system $X_{act}$, $Y_{act}$, $Z_{act}$. The latter deviates from the former by an offset error and by an attitude error.

Figure 8A:
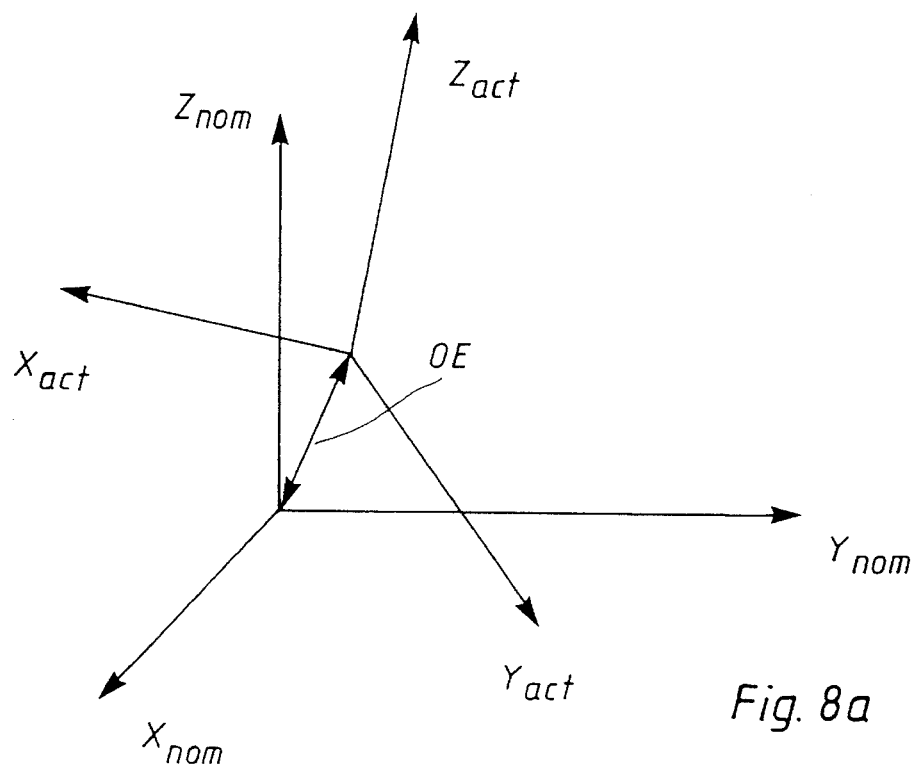
FIG. 8 illustrates the calibration parameters for a robot axis.

As shown in FIG. 8a, the position of the origin of coordinates in the actual coordinate system is indicated by a vector OE. This vector has three components and is expressed in the nominal coordinate system.

Figure 8B:
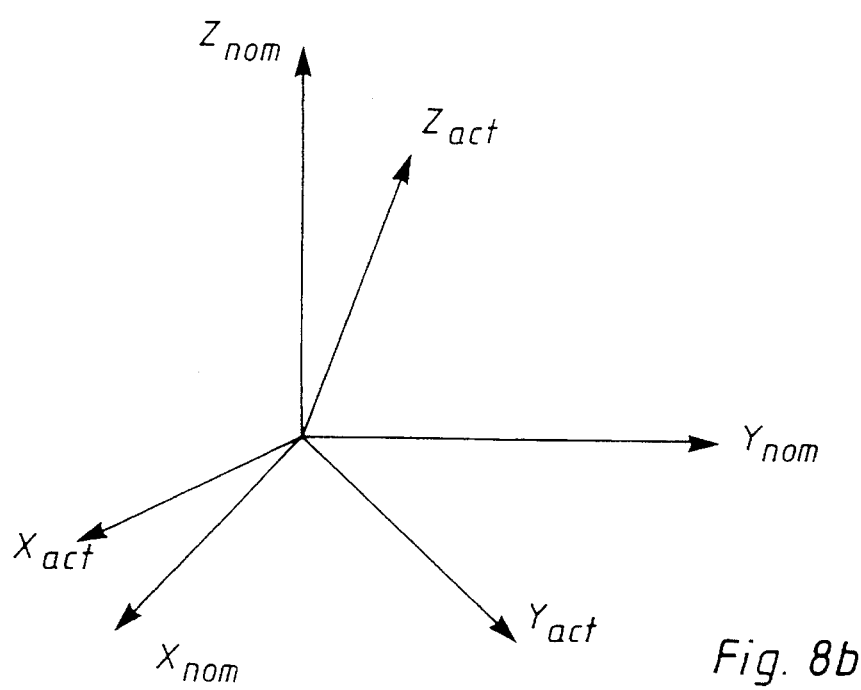

As shown in FIG. 8b, the actual coordinate system has an attitude error in relation to the nominal system. Three angles are required to rotate the actual system into agreement with the nominal one, and these three angles indicate an attitude error.

The three components of the offset vector OE and the three angles of the attitude error constitute the six calibration parameters of the robot axis in question.

The invention has been described above in connection with an industrial robot with rotating axes only, but the invention can be applied with the same advantage to robots with linear axes only, or with a combination of linear and rotating axes. Also, the method according to the invention is applicable to robots with a number of axes different from that described above. Further, it has been described above how the method is used for calibration of all the axes of the robot. It may sometimes be suitable to refrain from calibration of one or more of the robot axes. To achieve the greatest possible variation between the robot configurations used, the robot can be provided with several calibration bodies arranged at different locations within the working range of the robot, which locations are selected such that the greatest possible differences are obtained between the robot configurations at the different measurements. In the preferred embodiment of the invention described above, the calibration tool is caused during the calibration to make mechanical contact with a calibration body.

A preferred embodiment of the invention has been described above, in which the calibration body is arranged with its edges in parallel with the axes of the base coordinate system. This orientation of the body can be made simple, and if the two measurements in each measuring body are performed at opposite points on the calibration body, a minor deviation of the orientation of the body entails negligible errors in the determination of the calibration parameters.

According to an alternative embodiment of the invention, the calibration body can be arranged completely arbitrarily within the working range of the robot, that is, both with an arbitrary position and with an arbitrary orientation. The calibration method is thereby simplified in that no alignment of the body into parallelism with the base coordinate system needs to be done. In this embodiment the equation systems described above have to be supplemented by equations which take account of the orientation of the calibration body.

This can be described with the aid of three angles of rotation in relation to the base coordinate system. These three angles then constitute three further unknown parameters, and the number of parameters to be determined, and hence the minimum number of pairs of measurements, will then be equal to the number of calibration parameters plus three, that is, in the example described above 36+3=39.

It has been described above how six calibration parameters are determined for each robot axis. The number may be greater, for example if during the calibration it is also desired to take account of non-linearities in the position transducers of the axis. The number can also be smaller, for example if it is known from experience that one or more calibration parameters are known or of a negligible magnitude.

I claim:

1. A method for calibration of an industrial robot which has a plurality of movement axes with a position transducer for each of said axes which is adapted to supply an output signal ($\emptyset$) which defines the current position of the axis, a configuration of the robot being defined by the position of the movement axes, and a robot hand for supporting a tool, wherein a number of calibration parameters for the robot are determined by the steps of a) providing the robot with a calibration tool supported by the robot hand,
   b) running the robot into contact with the two side surfaces of at least one pair of plane and pairwise parallel side surfaces of a calibration body, the distance between said surfaces being accurately known,
   c) reading and storing, when the robot is in contact with one of the side surfaces, the output signals from the position transducers of the robot, and storing information which indicates which side surface of the calibration body has been used,
   d) repeating steps b) and c) a number of times at least equal to the number of calibration parameters and with different configurations of the robot,
   e) calculating the calibration parameters independently of the position of the calibration body in relation to the robot, using
      1) the kinematic equations of the robot,
      2) a model of the relationship between axial position and position transducer signal,
      3) the known distance between the two side surfaces of each pair of side surfaces used for measurement,
      4) the read and stored position transducer signals.

2. A method according to claim 1, wherein a plurality of calibration parameters are computed for at least one of said axes.

3. A method according to claim 1 wherein the calibration body has a parallel-epipedic shape with plane surfaces which are oriented approximately perpendicular to axes (x,y,z) of a fixed, orthogonal base-coordinate system, of the robot, said axes having predetermined directions in relation to the robot.

4. A method according to claim 1, in which the robot hand is supported by a plurality of robot parts which are movable in relation to one another and in which the orientation of the robot hand may be varied independently of the configuration of the robot parts, wherein for at least some pair of the side surfaces of the calibration body a plurality of measurements are carried out with mutually different orientations of the robot hand.

5. A method according to claim 1, wherein said calibration body is placed with arbitrary angular orientation.

* * * * *